(12) United States Patent
Krone et al.

(10) Patent No.: US 6,508,050 B1
(45) Date of Patent: Jan. 21, 2003

(54) DEVICE FOR HARVESTING AGRICULTURAL, STALK-LIKE MATERIAL

(75) Inventors: Bernard Krone, Spelle (DE); Josef Horstmann, Ibbenbueren (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 32 days.

(21) Appl. No.: 09/786,659
(22) PCT Filed: Jul. 7, 2000
(86) PCT No.: PCT/EP00/06449
  § 371 (c)(1),
  (2), (4) Date: Apr. 16, 2001
(87) PCT Pub. No.: WO01/03494
  PCT Pub. Date: Jan. 18, 2001

(30) Foreign Application Priority Data

Jul. 8, 1999 (DE) .......................................... 199 31 684

(51) Int. Cl.[7] .............................................. A01D 57/30
(52) U.S. Cl. ........................................................ 56/192
(58) Field of Search ................................ 56/13.6, 16.4, 56/14.5, 228, 11.9, 192, 366, 367, 370, 372, DIG. 21

(56) References Cited

U.S. PATENT DOCUMENTS

| | | | | |
|---|---|---|---|---|
| 3,780,506 A | * | 12/1973 | Tashiro | 56/14.5 |
| 4,330,982 A | * | 5/1982 | Vissers et al. | 56/192 |
| 4,392,339 A | * | 7/1983 | Berlivet et al. | 56/192 |
| 5,111,645 A | * | 5/1992 | Klinner | 56/364 |
| 5,175,987 A | * | 1/1993 | Underhill et al. | 56/372 |
| 5,507,139 A | * | 4/1996 | Delperdang et al. | 56/366 |

\* cited by examiner

Primary Examiner—Robert E. Pezzuto
(74) Attorney, Agent, or Firm—Jordan and Hamburg LLP

(57) ABSTRACT

A device (1) for mowing agricultural, stalk-like material and forming a windrow from the mown stalk-like material, which is to be deposited next to the device, the device having a mowing unit (10), a preparer (11) and a transverse conveyor (12), the transverse conveyor (12) comprising a spiral conveyor (13) and a casing (23) surrounding the spiral conveyor (12) at least regionally and the end region of the transverse conveyor (12), lying in the conveying direction of the spiral conveyor, forming a free ejection end (37), is constructed so that the spiral conveyor (13) is undergrasped in a lower region (32) at a little distance, trough-like, by the casing (23) and expanded in hood-shaped fashion in an upper region (33) of the casing (23) opposite the radial extent of the spiral conveyor (13).

32 Claims, 4 Drawing Sheets

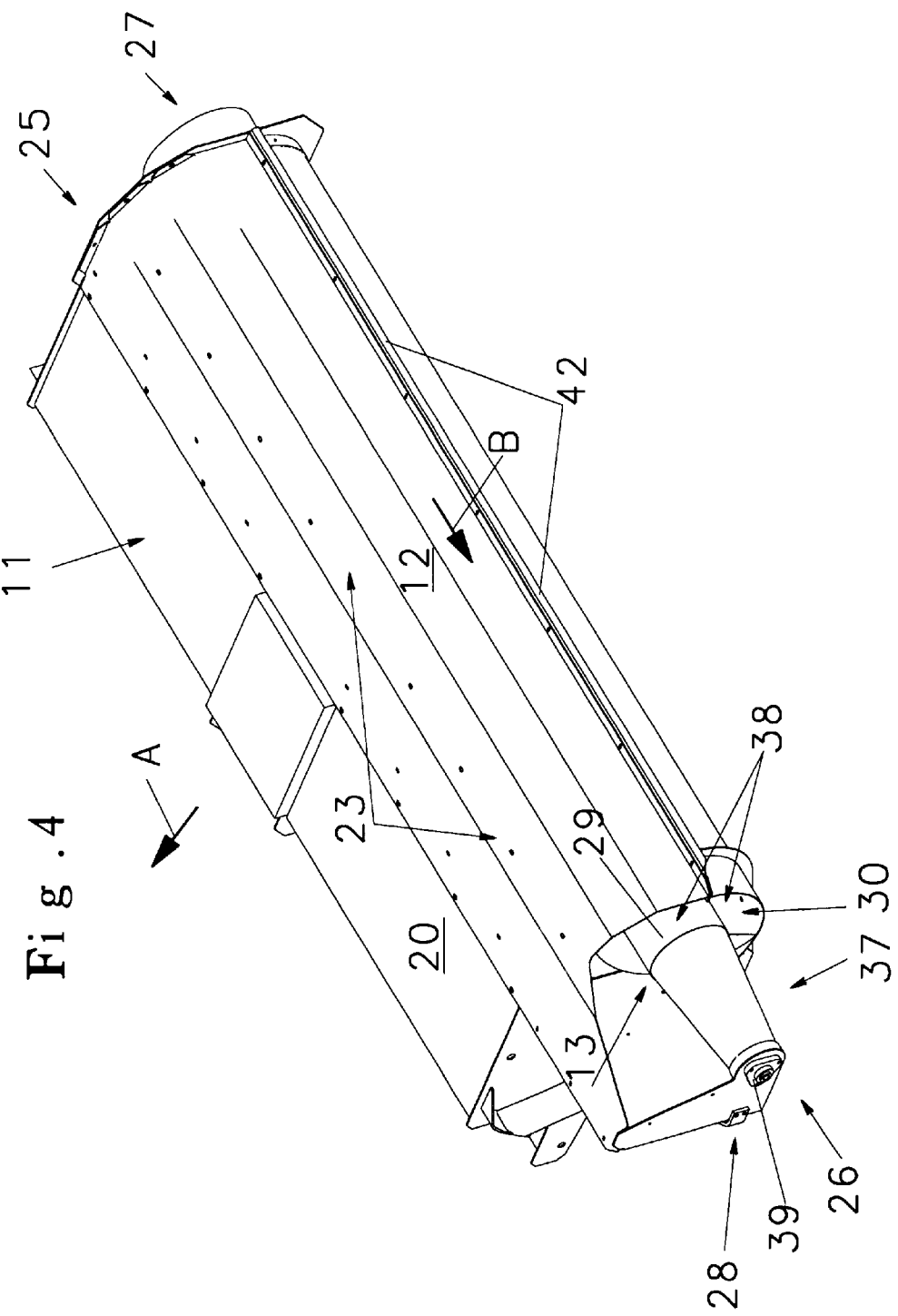

DEVICE FOR HARVESTING AGRICULTURAL, STALK-LIKE MATERIAL

BACKGROUND OF THE INVENTION

The invention relates to a device for mowing agricultural, stalk-like material and forming a windrow from the mown stalk-like material, which is to be deposited next to the device.

Such a device is used for mowing and working up grass or similar stalk-like material, which has been grown in meadows or fields, in one working process and for forming or placing together the largest possible windrows of stalk-like material for the succeeding equipment.

For example, a chopper, equipped with a pick-up drum as succeeding equipment, which is also used for chopping corn in order to prepare it for silage feed, is designed, in practice, for a large throughput of stalk-like material and, so that it is used utilized fully, requires corresponding by large portions of stalk-ike material that is large windrows. This can be achieved, for example, by placing together the stalk-like material of two working surfaces by changing the direction of travel (by 180°) of the mowing equipment or by placing together the stalk-like material of several devices, which are mounted on a mowing device.

From the British patent 2,088,684, a pulled device is known, which is equipped with running and supporting wheels and for which a cutter bar in the form of a drum cutter bar, a preparer with a rotating rotor and a transverse conveyer as suspended consecutively in an equipment frame. The rotor of the preparer transfers the prepared stalk-like material to the transverse conveyer, which comprises a spiral conveyer, which is mounted at both ends, is aligned at right angles to the working direction of the device and has a driving mechanism, which permits the spiral walks to rotate from the top towards the front and downward. The spiral conveyer is surrounded by a casing, the end of which at the ejection side is shortened, so that the inner body of the spiral conveyer is exposed in the shortened region of the casing up to the bearing support in a bracket. In the direction of the preparer, the casing is also open and, at the bottom, has a bottom part, which is directed tangentially to the spiral conveyer in the working direction of the device as a lower cover for the spiral conveyer. It is a disadvantage of this known embodiment of the device that the flow of stalk-like material, already accelerated during the preparation by the preparer, which may be equipped, for example, with a pronged rotor, is thrown onto the transverse conveyer and subsequently in a straight line against the casing ofthe spiral conveyer and against the spiral conveyer rotating inthe opposite direction to the flow of material and decelerated here to a value of "zero". The worked-up harvested material from the spiral conveyer ofthe transverse conveyer must then be accelerated once again and conveyed conversely. Furthermore, from bearing to bearing, the inner body ofthe spiral conveyer, viewed from the cross section, continuously has the same construction so that the ejection region of the transverse conveyer is very constricted and therefore deceleration of the harvested material, accelerated once more by the spiral conveyer, also take place here. Such an interruption or impairment of the flow of the material leads to an irregular deposition of the windrow. All forces, directed against the flow of material must be rated as a loss and must be debited to the engine output of the pulling and/or driving machine.

SUMMARY OF THE INVENTION

It is therefore an object of the invention to improve the device of the type mentioned so that the acceleration, once imparted to the flow of stalk-like material by an equipment unit of the device, is retained approximately on the way to the deposition in the window on the ground of the field or meadow or decelerated as little as possible.

Due to the inventive device, an increase in the throughput by the transverse conveyor, associated with a wide ejection, is attained. Due to the hood-shaped expansion, atransporting space is formedbetweenthe casing andthe spiral conveyor, so that the stalk-like material, striking the spiral conveyor, need not be decelerated and instead can be conveyed further at ahigh throughput. The stalk-like material does not have to rotate completely about the axis of the spiral conveyor; it can, instead, be transported rapidly between the upper flanks of the screw and the hood-shaped expansion. By these means, the rate, at which the stalk-like material is conveyed further, is increased as a whole and, because of the high conveying speed, the throwing width at the ejection end is enlarged, so that such a device can also find use, for example, as a lateral component of mowing equipment and ejects the windrow in the central region of the mowing equipment, where it can be placed on a windrow previously formed by a front attachment of the mowing equipment. By these means, it is possible to form very large windrows, which are far apart.

The ejection is furthermore improved if the casing, in its rear region at the ejection end, has a recess and if the axle beam if the spiral conveyor tapers and, in particular, tapers conically towards its bearing end at the ejection end.

The conveying of stalk-like flow in the transverse conveyer is particularly good if a stripper and guiding bar is provided in the transition regions of the casing from the trough-like lower region to the hood-shaped upper region between the casing and outer periphery of the spiral conveyer. By these means, the proportion of stalk-like material, which does not revolve around the axis of the spiral conveyer and, instead, is transported at a high rate in the transporting space between the upper region of the spiral conveyer and the hood-shaped expansion, is increased clearly.

In particular, it is furthermore advantageous to have the preparer, for example, a pronged rotor, rotate in the same direction as the screw conveyer, the flow of stalk-like material being transferred overhead to the transverse conveyer. Because the upstream pronged rotor is rotating in the same direction, the spiral conveyer supports the conveying flow and imparts an additional acceleration to the flow of stalk-like material by means of flanks of the screw and as a result of the continuous pitch. In particular, the stripping and guiding bar contributes in the transition region of the casing from the lower rear to the upper hood-shaped region to the fact that the flow of stalk-like material can not be pulled under the spiral conveyer in the trough-like region. The stalk-like material is conveyed largely in the upper region between the hood and the axle beam of the spiral conveyer. In addition, the stripper and guiding bar provide wrapping protection for the spiral conveyer. Since the casing of the transverse conveyer and the housing of the preparer, especially of a pronged rotor, form a unit, the air flow, generated by the pronged conveyer, supports the conveying of the stalk-like material, so that the latter experiences a high overall acceleration, so that the stalk-like material is deposited significantly further then in the case of a conventional transverse conveyer next to the device or within the inner region of a lane of a mower.

A reduction in the cross section of the axle beam of the spiral conveyer, for example, in a construction as a cone, supports the conveying process of the flow of the stalk-like material in that more free space with fewer obstacles is created in the ejection region. Depending on the nature of the stalk-like material that is to be processed, a spiral walk on the conical part of the inner body in the ejection region can support a selective guidance on the flow of stalk-like material.

Further advantages and details arise out of an example of the object of the invention, which is described in the following and shown in the accompanying drawings.

BRIEF DESCRIPTION OF THE DRAWINGS

FIG. 4 show a perspective representation of a device without a cutter bar for illustrating the closed unit of the casing of the pronged rotor and of the transverse conveyer.

DESCRIPTION OF THE PREFERRED EMBODIMENTS

Figure 1:
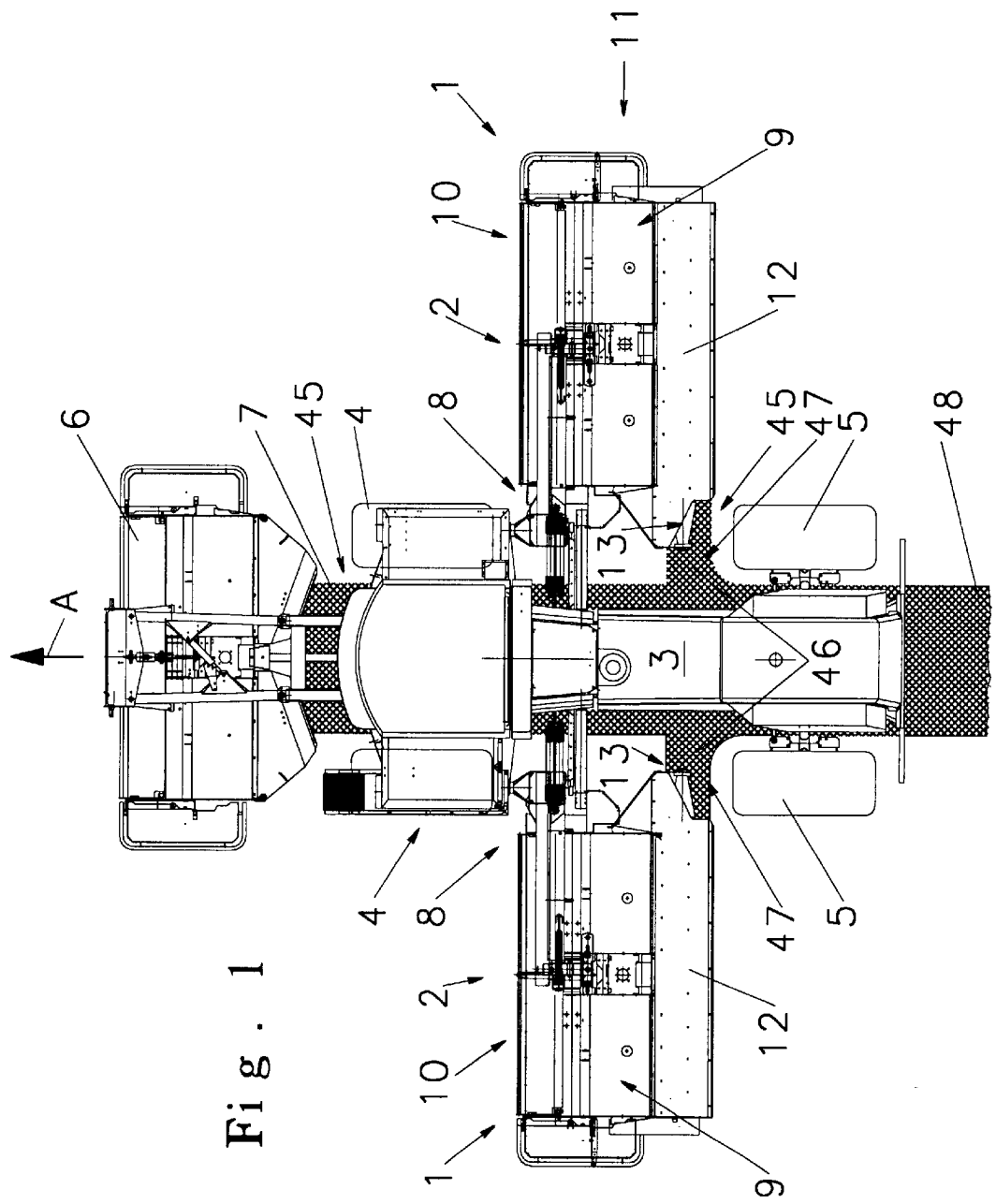
FIG. 1 shows a diagrammatic representation of mowing equipment in plan view with inventive devices in a construction as working aggregates in practical, use mounted on both sides for piling together several windrows of stalk-like material.

In FIGS. 1 to 4, a device 1 is shown, similar to those disposed as a working aggregate 2 on either side of the mowing device 3, constructed as a self propelled carrier vehicle between the front and rear wheels 4, 5. The device 1 at the left side of the carrier vehicle 3 is constructed here as the mirror image of the device 1 at the right side. In their finction, the two constructions are identical. A further working aggregate 6 which is assembled from a mowing device and a preparer in combination is mounted in front of the front wheels 4 in the front attachment. The windrow 7 is deposited by the working aggregate 6 behind the preparer and between the front wheels 4 of the carrier vehicle. The devices 1, disposed on either side of the carrier vehicle 3, are connected with the latter over extension and supporting arms 8 held pivotably at the carrier vehicle 3 and can be transferred from an approximately horizontal working and operating position into an approximately vertical transporting position and vice versa. Over driving means, which can be coupled with extension and supporting arms 8, the device 1 is driven from the carrier vehicle 3. The device 1 itself is composed of a cutter bar unit 10, a preparer 11 and a transverse conveyer 12 with a spiral conveyer 13, which are held consecutive in an equipment frame. The cutting bar 10 is constructed, for example, as a disk mowing unit and has working tools, which rotate about an approximately vertical axis of rotation 14 and are constructed as cutting elements 15. The cutting elements 15 are mounted next to one another in a lower spar 16, accommodating the driving mechanism, and are driven by the carrier vehicle 3 over spur wheels 17 in the spar 16. The preparer 11, which is also held by the equipment frame 9, is behind the cutter bar 10, as seen in the working direction A. The preparer 11 consists of a pronged rotor 19, which rotates about a horizontal axis 18 in the direction of the arrow "a"and is surrounded by a housing 20, which from a housing 20, which is surrounded by lateral guiding organs 21 and by an upper, adjustable guiding organ 22 (TRANSLATOR'S NOTE: sic!). The preparer 11 in turn is followed by the transverse conveyer 12 with the spiral conveyer 13. The latter is connected with removable connections, which are not shown, with a casing 23 with the housing, 20 of the preparer 11. The side parts 24, 25 of the transverse conveyer 12 likewise form extended side parts of the device 1 with the guiding organs 21. The spiral conveyer 13, mounted at both ends 26, 27 either at the side part 25 or at a bracket 28 supported at the side part 24, consists of an axle beam 29, on which the actual endless screws are fastened with their endless screw flanks 30, for example, by awelded connection. The endless screws are mounted on the axle beam 29 so that the spiral conveyer 13, when rotating in the direction indicated by the arrow b, passes on the stalk-like material in the conveying direction B. As shown particularly in FIG. 3, the spiral conveyer 13 is now surrounded by a casing 23, which, to begin with, embraces the spiral conveyer 13 trough-like in its lower region 32, directed towards the ground and at a close distance. In its rear upper region 33, the casing 23 expands hood-like with respect to the spiral conveyer 13, so that space for transporting the stalk-like material results between the casing 23 and the spiral conveyer 13 and, at the casing 23, upright guiding cross members 34 can be held between the casing 23 and the spiral conveyer 13 at a distance from one another. The guiding cross members 34 can be seen from above in FIG. 2. In the left part of FIG. 2, they are shown as invisible under the casing. In the right part of FIG. 2, the casing 23 is shown truncated so that the guiding cross members 34 appear to be shown freely visible lying in the space. In plan view, the guiding cross members 34 can be formed arc-shape or also be formed by bending from several adjoining angles. In any case, the front end of a guiding cross member 34, as seen in the driving direction, is disposed at a smaller angle to the driving direction A, than is the rear end. The stalk-like material appearing is therefore taken up by guiding plates, which are almost parallel to the direction of conveying or are directed at an acute angle thereto, and carried along in their deflection angles, as a result of which it reaches a position almost parallel to the conveying direction B of the spiral conveyer 13. The deflection angle for the stalk-like material over the guiding cross members 34 should be between 70° and 90°.

Figure 2:
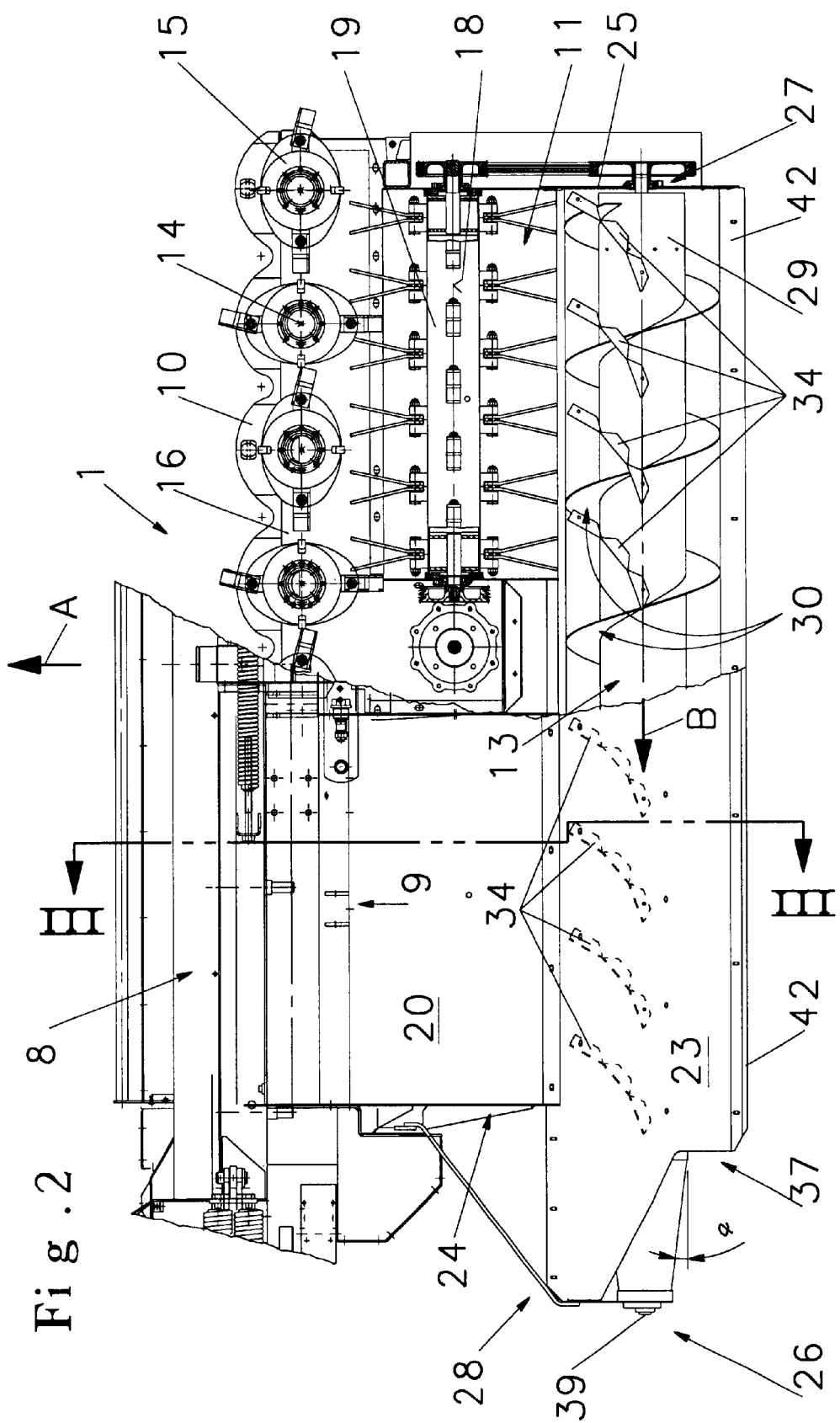
FIG. 2 shows a partially truncated and enlarged representation of a device in plan view, as shown in FIG. 1, at a mower as a working unit, mounted at the right side as seen in the working direction.
Figure 3:
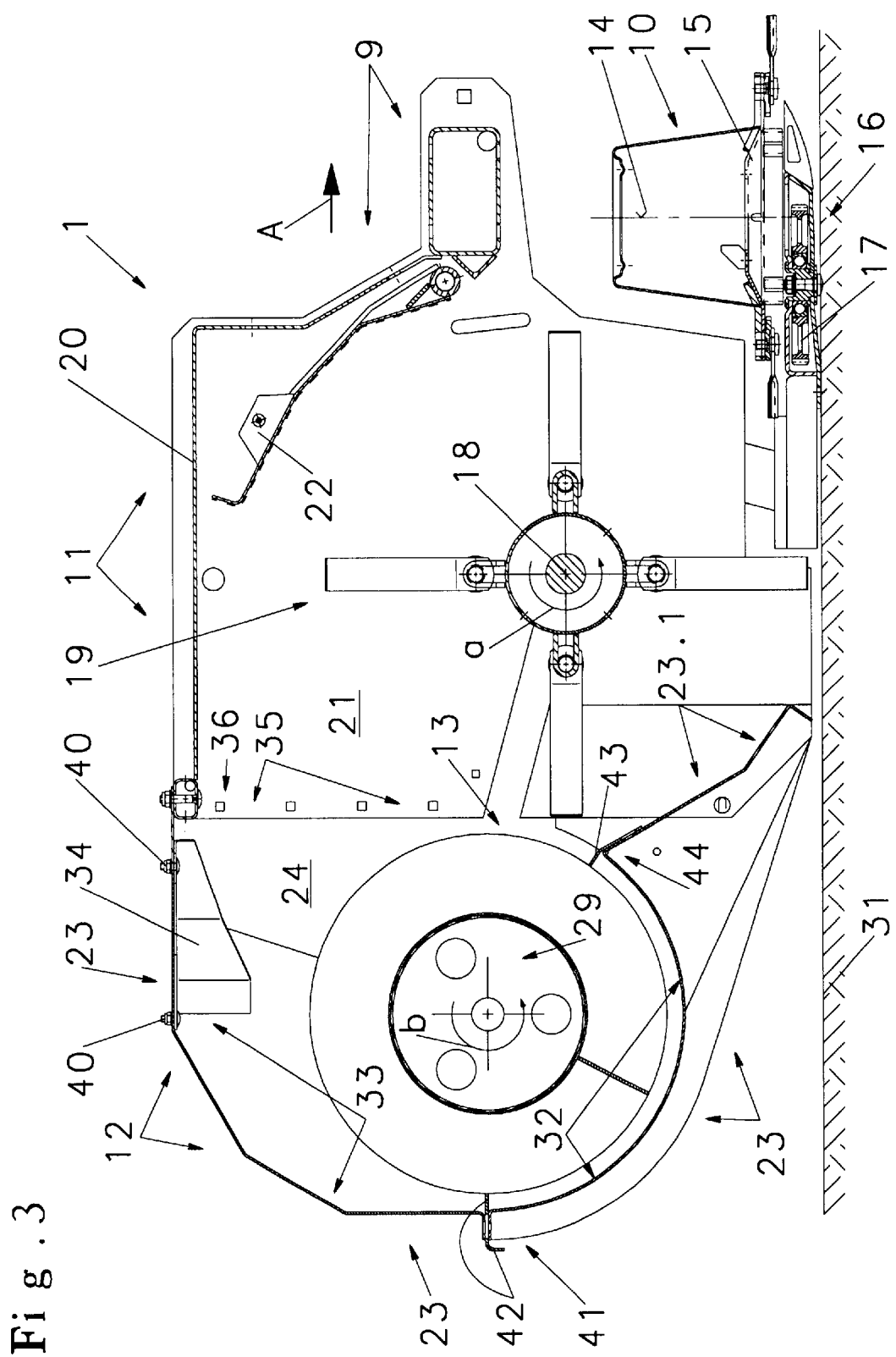
FIG. 3 shows a sectional representation of the device along the line III—III in FIG. 2.

The front upper region 35 ofthe casing 23 leaves a supplying and transferring opening 36 free. The stalk-like material, conveyed overhead by the pronged rotor 19 of the preparer 11, reaches the transverse conveyer 12 through this supplying and transferring opening 36. The size or the length of the supplying and transferring opening 36 in the transverse direction, corresponding to the conveying direction B, of the transverse conveyer 12, depends on the construction of the preparer. The casing 23 can therefore also be closed partially in the upper front region 35. In the example of FIGS. 2 and 3, the transverse conveyer 12 is extended in the ejection region 37 opposite the housing 20 of the pronged rotor 19, and the casing has an ejection opening 38 or is shortened in some cases. However, the axle beam 29 of the spiral conveyer 13 continues to extend to the bearing 39, but is constructed in this region without a continuous screw. So that the space, occupied by the axle beam 29, is reduced in size for a better flow of a stalk-like material, it is constructed conically at the end and thus experiences a reduction in cross section in this area. The angle α, as shown in FIG. 2 at the axle beam 29, should be about 5° to 15° and preferably 10°. In the embodiment shown, the guiding cross members 34 are fastened with screws 40 to the casing 23. However, the possibility also exists of constructing these so that they can be adjusted over additional boreholes in the casing 23 which are not shown. Likewise, the possibility exists of constructing the guiding cross members 34 so that they are hinged pivotably at one side at the casing 23 and can be adjusted and locked adjustably in an arc-shaped slot guide (not shown) in the casing 23. By these means, the user of the device 1 can have an influence on the guidance of the flow of stalk-like material, depending on the nature and the moisture condition of the stalk-like material. Already the identical directions of rotation of the spiral conveyer 13 and the pronged rotor 19 result a in continuous conveying of the flow of stalk-like material, since dust formation is avoided by these means.

Since an adjustable stripping and guiding element 24 is brought in between the casing 23 and the spiral conveyer 13 approximately in the transition region 41 of the casing 23 ofthe transverse conveyer 12 from the lower rear region 32 to the upper hood-shaped region 33, it is achieved that the flow of stalk-like material (stalk-like material) is not pulled under the spiral conveyer in the trough-like region. Because of the presence of the stripping and guiding element 42, the stalk-like material is conveyed largely in the upper region 33 between the hood and the inner body 29 of the spiral conveyer 13. At the same time, the stripping and guiding element 42 functions as a wrapping protection. Wrapping protection is also achieved by a further stripping and guiding element 43 in the front lower transition region 44. Already at the start of the supplying and transferring opening 36, a guiding body 23.1, directed to the ground 31, as guiding device for the stalk-like material, can adjoin the troughlike region 32 of the casing 23. However, this guiding body 23.1 is a component of the transverse conveyor.

The device 1 of the transverse conveyor 12 can also be constructed in such a manner, that the transverse conveyor 12 can be removed from the device 1 over fasteners, which are not shown. The flow of stalk-like material is then deposited broadly directly in prepared form on the ground. Furthermore, as shown in the British patent 2,088,684, the transverse conveyor 12 can also be swiveled away from the preparer 11 or constructed displaceably. The transverse conveyor 12 then reaches a resting position, in which it no longer interferes with the course of mowing and preparation.

When used practically in accordance with FIG. 1, the stalk-like material 45, cut off by the cutter bar 10, which is constructed as a disk cutter bar 10, is taken hold of by the pronged rotor 19 and prepared and accelerated during an overhead conveying and transferred as a flow of stalk-like material 46 to the transverse conveyor 12. In so doing, the flow of stalk-like material 48 is selectively deflected over the guiding cross members 34, which are disposed in a distributed manner, and conveyed by the spiral conveyer 13 because of their rotation in the direction of the arrow b, which is also the direction of rotation of the pronged rotor 19 in the conveying direction B largely inthe rear and upper region 33 to the ejection opening 38. The flow of stalk-like material 46 leaves the transverse conveyor 12 here and is deposited as a windrow 47 within the inner region of the rear wheels 5 of the carrier vehicle 3. As shown in FIG. 1, initially a windrow 7 is deposited by the front working aggregate 6 between the front wheels 4 and a further windrow is then supplied to it by the laterally disposed and inventively equipped devices 1. In this way, a total windrow 48 is deposited on the ground behind the carrier vehicle 3. The total windrow 48 comprises stalk-like material 45, which was cut to a total width of about 10 meters in one working cycle, so that even large choppers, in front of which pick-up drums are disposed, can appropriately be charged to capacity.

In use, the mowing equipment can deposit a central windrow 48 while traveling in one direction and, after turning, while traveling in the other direction,form a further windrow 48, parallel to the first one, from the stalk-like material mown during this return trip. The two windrows 48 are then spaced apart by twice the width of a lateral extension arm. As a result, a particularly advantageous working procedure results, with large windrows, which are spaced far apart.

What is claimed is:

1. A device (1) for mowing agricultural, stalk-like material and forming a windrow from the mown stalk-like material, which is to be deposited next to the device, the device having a mowing unit (10), a preparer (11) and a transverse conveyor (12), the transverse conveyor (12) comprising a spiral conveyor (13) and a casing (23) surrounding the spiral conveyor (12) at least regionally and the end region of the transverse conveyor (12), lying in the conveying direction of the spiral conveyor, forming a free ejection end (37), wherein the spiral conveyor (13) is undergrasped in a lower region (32) at a little distance, trough-like, by the casing (23) and expanded in hood-shaped fashion in an upper region (33) of the casing (23) opposite the radial extent of the spiral conveyor (13).

2. The device of claim 1, wherein the casing (23), in the region of the ejection end (37), has a recess (38) at least in the rear region with respect to the driving direction (A).

3. The device of claim 1, wherein the spiral conveyor (13) is supported rotatably at its end regions lying transversely to the driving direction (A) and the axial beam (29), carrying the spiral walks, has a reduced cross section at the ejection end (37).

4. The device of claim 1, wherein guiding cross members (34) are disposed within the hood-shaped expansion (35) of the casing (23).

5. The device of claim 4, wherein several guiding cross members (34) are disposed next to one another in the conveying direction (3) of the spiral conveyor (13).

6. The device of claim 5, wherein the region of a respective guiding cross member (34), which is the front region in the driving direction (A), encloses a smaller angle with the driving direction (A), measured from the driving direction (A) towards the conveying direction (B) of the spiral conveyor (13), than does the region, which is the rear region in the driving direction (A).

7. The device of claim 6, wherein the guiding cross members (34) divert the flow of stalk-like material by about 70° to 90° in the conveying direction (B) of the spiral conveyor (13).

8. The device of claim 4, wherein the guiding cross members (34) are held adjustably in their position at the casing (23).

9. The device of claim 4, wherein the guiding cross members (34) are hinged at one side pivotably at the casing (23), the other end being adjustable and lockable in an arc-shaped guiding connecting link assigned to the casing (23).

10. The device of claim 4, wherein the preparer (11) is held parallel to the axis of the spiral conveyor (13) and has a direction of rotation (a) identical to the direction of rotation (b) of the spiral conveyor (13).

11. The device of claim 10, wherein the speed of rotation of the spiral conveyor (13) is greater than the speed of rotation of the preparer (11).

12. The device of claim 1, wherein a stripper and guiding bar (42; 44) is provided in the transition region from the trough-like surrounded region (32) to the hood-shape surrounded region (33) and/or to the front region of the spiral conveyor (13) facing the preparer (11) between this spiral conveyor (13) and the casing (23).

13. The device of claim 1, wherein the reduction in the cross section of the axle beam (29) of the spiral conveyor (12) is constructed conically at the ejection end (37) of the stalk-like material.

14. The device of claim 13, wherein the angle α of the conical region from the axle beam (29) of the spiral conveyor (13) is 5° to 15° and preferably 10°.

15. The device of claim 1, wherein the transverse conveyor (12) can be removed from the device (1) over fasteners, which are to be undone.

16. The device of claim 1, wherein the transverse conveyor (12) can be swiveled or shifted into a position of rest, which does not interfere with the course of mowing and preparation of the device (1).

17. Mowing equipment with one mowing device for stalk-like material at the front and two at the side, the mowing devices at the front and at the side transporting for transporting on a common windrow, assigned essentially to a vertical, longitudinal median plane of the mowing equipment, wherein mowing devices at the side are formed according to claim 1.

18. A device for mowing agricultural material and forming a windrow from the mowed material, comprising:

a mowing unit for mowing the material;

a transverse conveyor for transporting the mowed material in a conveying direction, said tranverse conveyor comprising a spiral conveyor and a casing surrounding only a portion of said spiral conveyor such that an ejection opening is form at an end of said spiral conveyor, said casing having a lower region arranged at least partially below and a small distance from said spiral conveyor and an upper hood region expanding over said spiral conveyor; and a preparer for transferring the mowed material from said mowing unit to said spiral conveyor through said hood region of said casing.

19. The device of claim 18, wherein said casing has a recess at least in a rear region relative to a driving direction of the device, said recess encompassing said ejection opening.

20. The device of claim 18, wherein said spiral conveyor is oriented in a direction transverse to a driving direction of the device and has opposed end regions, said spiral conveyor being rotatably supported at said end regions.

21. The device of claim 20, wherein said spiral conveyor comprises an axle beam and spiral walks arranged on said axle beam, said axle beam having a reduced cross section proximate said ejection opening.

22. The device of claim 18, further comprising guide means arranged in said hood region of said casing for guiding the mowed material toward said spiral conveyor.

23. The device of claim 22, wherein said guide means comprise a plurality of guiding cross members arranged adjacent one another in the conveying direction.

24. The device of claim 23, wherein at least one of said guiding cross members has a front region and a rear region, said front region being arranged in front of said rear region relative to a driving direction of the device and forming a smaller angle measured from the driving direction to the conveying direction than an angle formed between said rear region and the driving direction measured from the driving direction to the conveying direction.

25. The device of claim 23, wherein said guiding cross members are structured and arranged to change a flow direction of the mowed material from the driving direction of the device by about 70° to 90° toward the conveying direction.

26. The device of claim 23, wherein at least one of said guiding cross members is held adjustably in position in said casing.

27. The device of claim 18, wherein said preparer is oriented substantially parallel to an axis of said spiral conveyor and has a direction of rotation substantially identical to a direction of rotation of said spiral conveyor.

28. The device of claim 18, further comprising a stripper and guiding bar arranged in said casing in a transition region between said lower region of said casing and said hood region of said casing.

29. The device of claim 18, wherein said casing surrounds a rear of said spiral conveyor in a driving direction of the device and said preparer is arranged in front of said spiral conveyor in the driving direction, further comprising a stripper and guiding bar arranged in said casing between said lower region of said casing and said spiral conveyor facing said preparer.

30. The device of claim 18, wherein said spiral conveyor comprises an axle beam, said axle beam having a conical region adjacent said ejection opening.

31. The device of claim 30, wherein an angle of said conical region of said axle beam of said spiral conveyor is 50° to 15°.

32. A mowing vehicle, comprising:

a frame;

two of the devices of claim 18, each arranged on a respective side of the frame; and a mowing device arrange in front of said frame.

* * * * *